2,914,555
4-ALKYLPHENYL ESTERS OF 4-CHLOROBENZOIC ACID

David A. Gordon and John M. Corbett, Midland, Mich., assignors to The Dow Chemical Company, Midland, Mich., a corporation of Delaware No Drawing. Application July 2, 1958
Serial No. 746,106

5 Claims. (Cl. 260—476)

The present invention relates to 4-alkylphenyl esters of 4-chlorobenzoic acid, and is directed to compounds corresponding to the formula

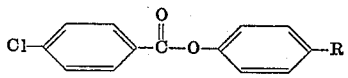

In the above and succeeding formulae, R represents alkyl containing from 5 to 8 carbon atoms inclusive. The novel 4-alkylphenyl 4-chlorobenzoates are crystalline solids somewhat soluble in many common organic solvents such as the lower alkanols, and of low solubility in water. They are useful as parasiticides and are adapted to be employed in compositions for the control of many common bacterial, fungal and insect organisms, such as the soil-borne fusarium wilt of potatoes and tomatoes; nematodes; flies; cockroaches; and Mexican bean beetles.

The new compounds may be prepared by causing a reaction between 4-chlorobenzoyl chloride and a phenolic reactant corresponding to the formula

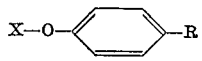

wherein X represents hydrogen or an alkali metal. Conveniently the reaction is carried out in a reaction mixture comprising a liquid reaction medium. When employing a phenolic reactant in which X represents hydrogen, the desired product is more readily obtained when a hydrogen chloride neutralizing agent is employed in the reaction mixture. Such agent may be a tertiary amine or an alkali metal compound whose aqueous solutions are alkaline, whereby an intermediate alkali metal salt of phenolic reactant is formed in and employed without isolation from the reaction mixture. Alternatively, the alkali metal salt of phenolic reactant may be separately prepared, isolated, and thereafter employed in the present reaction. The reaction is somewhat exothermic and takes place at temperatures of 0° to 100° C. and preferably at 10° to 80° C., with the production of the desired product and halogenic by-product. When employing an alkali metal salt of phenolic reactant, the byproduct is alkali metal chloride. When employing an unneutralized phenol as phenolic reactant, byproduct is hydrogen chloride which escapes as a gas or is removed in solution in the reaction medium. Alternatively, when a hydrogen chloride neutralizing agent is employed, such hydrogen chloride appears as a product of reaction with such agent, for example as a hydrochloride of a tertiary amine or as an alkali metal chloride.

Reaction temperatures may be controlled by such means as regulating the rate of contacting the reactants, and external cooling. Good results are obtained when employing 4-chlorobenzoyl chloride and the 4-alkylphenol reactant in substantially equimolecular proportions. When a hydrogen chloride neutralizing agent is employed, it is preferably employed in an amount which is about from 0.1 to 20.0 percent in excess of that equimolecular with the 4-chlorobenzoyl chloride.

In carrying out the reaction, the 4-chlorobenzoyl chloride is added slowly, portionwise, to a mixture of 4-alkylphenol reactant, together with hydrogen chloride neutralizing agent if such agent is employed, dispersed in the liquid reaction medium such as petroleum ether or benzene. The contacting of the reactants is carried out with stirring and in the reaction temperature range. In the preferred method of operation the reaction is carried out at room temperature and in water as reaction medium. Upon completion of the reaction, the reaction mixture may be washed with water. Any organic reaction medium may then be removed by evaporation under reduced pressure to obtain the desired product as a crystalline residue. When the reaction is carried out in water as reaction medium, the desired product usually precipitates in the reaction medium during the course of the reaction and may be separated by filtration or decantation.

The following examples illustrate the invention but are not to be considered as limiting.

*Example 1.—4-(1,1-dimethylpropyl)phenyl 4-chlorobenzoate*

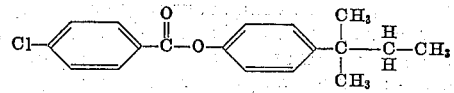

4-chlorobenzoyl chloride (175 grams; 1 mole) was added dropwise over a period of 45 minutes to a mixture consisting of 164 grams (1 mole) of 4-(1,1-dimethylpropyl)phenol and 48 grams (1.2 mole) of sodium hydroxide dispersed in 2 liters of water. The addition was carried out with stirring and at a temperature of from 20° to approximately 35° C. Stirring was thereafter continued for 5 hours to ensure completion of the reaction, as the temperature of the reaction mixture slowly equilibrated with room temperature. During the course of the reaction, product precipitated in the reaction mixture as a crystalline solid. Upon completion of the reaction, the reaction mixture was filtered, and the residue washed with water, dried, and recrystallized twice from methanol. As a result of these operations, there was obtained a 4-(1,1-dimethylpropyl)phenyl 4-chlorobenzoate product as a white crystalline solid melting at 73°–74° C.

*Example 2.—4-(1,1-dimethylbutyl)phenyl 4-chlorobenzoate*

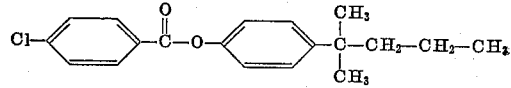

4-chlorobenzoyl chloride (175 grams; 1 mole) is added dropwise over a period of 45 minutes to a mixture consisting of 178.3 grams (1.0 mole) of 4-(1,1-dimethylbutyl)phenol and 61.7 grams (1.1 mole) of potassium hydroxide dispersed in 2 liters of water. The addition is carried out with stirring and at a temperature of from 20° C. to approximately 35° C. Stirring is thereafter continued as the reaction mixture is maintained at 20–25° C. for 3 hours, to complete the reaction. During the course of the reaction, product precipitates in the reaction mixture as a crystalline solid. Upon completion of the reaction, the reaction mixture is filtered, and the residue washed with water, dried, and recrystallized from ethanol. As a result of these operations there is obtained a 4-(1,1-dimethylbutyl)phenyl 4-chlorobenzoate product as a crystalline solid. 4-(1,1-dimethylbutyl)phenyl 4-chlorobenzoate has a molecular weight of 316.8.

*Example 3.—4-(1,1,3,3-tetramethylbutyl)phenyl 4-chlorobenzoate*

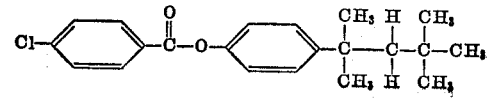

In a manner similar to that described in Example 1, 3 moles of 4-chlorobenzoyl chloride (525 grams) was added dropwise with stirring and cooling to a mixture of 3.3 moles (680 grams) 4-(1,1,3,3-tetramethylbutyl)phenol and 3.5 moles (140 grams) of sodium hydroxide in 2800 milliliters of water as reaction medium. The addition was carried out over a period of one hour, and at a temperature of from 10° C. to 25° C. Stirring was thereafter continued as the reaction went to completion at room temperature (about 25° C.) for 3 hours. During the course of the reaction, product precipitated in the reaction mixture as a crystalline solid. Upon completion of the reaction, the reaction mixture was filtered, and the residue water washed, dried, and recrystallized twice from ethanol. As a result of these operations, there was obtained a 4-(1,1,3,3-tetramethylbutyl)phenyl 4-chlorobenzoate product as a crystalline solid melting at 100.2–100.7° C.

The new compounds of the present invention are useful as parasiticides for the control of fungi, bacteria, and insects. For such use, the compounds may be dispersed on inert finely divided solids and the resulting preparations employed as dusts. Also, such preparations may be dispersed in water with or without the aid of a wetting agent and the resulting aqueous suspensions employed as sprays. In other procedures the compounds may be employed in solvents or as a constituent of solvent-in-water or water-in-solvent emulsions or as aqueous dispersions which may be applied as a spray, drench, or wash. In a representative operation, the application of an aqueous dispersion containing 1 pound of 4-(1,1-dimethylpropyl)phenyl 4-chlorobenzoate per hundred gallons of ultimate composition to a population of aphids parasitizing dwarf nasturtium plants resulted in a complete kill of the aphids.

We claim:
1. A compound corresponding to the formula

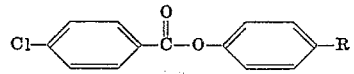

wherein R represents an alkyl radical containing from 5 to 8 carbon atoms, inclusive.
2. 4-(1,1-dimethylpropyl)phenyl 4-chlorobenzoate.
3. 4-(1,1-dimethylbutyl)phenyl 4-chlorobenzoate.
4. 4-(1,1,3,3-tetramethylbutyl)phenyl 4-chlorobenzoate.
5. A method for the preparation of a compound corresponding to the formula

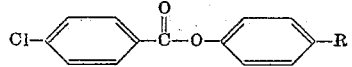

which comprises the step of causing a reaction between 4-chlorobenzoyl chloride and a compound corresponding to the formula

wherein X represents hydrogen or an alkali metal, and R represents an alkyl radical containing from 5 to 8 carbon atoms, inclusive.

References Cited in the file of this patent
UNITED STATES PATENTS

| | | |
|---|---|---|
| 2,138,809 | Reiff et al. | Nov. 29, 1938 |
| 2,665,301 | Monroe et al. | Jan. 5, 1954 |
| 2,789,957 | Pollock | Apr. 23, 1957 |